US008473384B2

(12) United States Patent
Stein

(10) Patent No.: US 8,473,384 B2
(45) Date of Patent: Jun. 25, 2013

(54) INVESTMENT MODEL FOR FORMATION OF CAPITAL AND VALUE CREATION

(76) Inventor: Lee H. Stein, Del Mar, CA (US)

( * ) Notice: Subject to any disclaimer, the term of this patent is extended or adjusted under 35 U.S.C. 154(b) by 0 days.

(21) Appl. No.: 11/857,677

(22) Filed: Sep. 19, 2007

(65) Prior Publication Data

US 2008/0071658 A1 Mar. 20, 2008

Related U.S. Application Data

(60) Provisional application No. 60/845,889, filed on Sep. 19, 2006.

(51) Int. Cl.
*G06Q 40/00* (2012.01)
(52) U.S. Cl.
USPC .................... 705/35; 705/39; 705/40; 705/44
(58) Field of Classification Search
USPC ...................................................... 705/15–45
See application file for complete search history.

(56) References Cited

U.S. PATENT DOCUMENTS

| 6,246,996 B1 * | 6/2001 | Stein et al. ................. 705/26.43 |
| 2001/0049616 A1 * | 12/2001 | Khuzadi et al. ................... 705/8 |
| 2003/0004749 A1 * | 1/2003 | Toneaki ............................ 705/1 |
| 2006/0026028 A1 * | 2/2006 | Knight ............................. 705/1 |
| 2007/0073625 A1 * | 3/2007 | Shelton .......................... 705/59 |

OTHER PUBLICATIONS

Patent Cooperation Treaty, International Application No. PCT/US2008/076490, dated Sep. 16, 2008, 6 pages.*
International Search Report, PCT/US2008/076490, Nov. 21, 2008.
International Preliminary Report and Written Opinion from corresponding PCT Application No. PCT/US2008/076490 mailed on Apr. 1, 2010.

* cited by examiner

*Primary Examiner* — Hai Tran
(74) *Attorney, Agent, or Firm* — Brinks Hofer Gilson & Lione

(57) ABSTRACT

A method for fostering technological innovation utilizing a competitive format is disclosed. The method includes establishing a contest entity organized to achieve a desired goal, organizing a financing entity to finance a prize associated with the contest entity, recruiting competitors to compete to achieve the desired goal, and establishing a compensation obligation between a plurality of competitors and the financing entity, such that each of the plurality of competitors assumes responsibility for the compensation obligation in order to compete to achieve the desired goal.

13 Claims, 8 Drawing Sheets

Legal Structure Legend

| Formation | Investment | Operations |
|---|---|---|
| Prize Capital, LLC | | |
| (1) Charter<br>(1) Operating Agreement | (1) Investment Representation Letters<br>(26) Securities filings | (2) Alliance Agreement with 501(c)(3) / XPRIZE<br>(3) Agreement with NGO/Portfolio Sponsor<br>(4) Escrow Agreement:<br>(5) Sponsorship Agreements<br>(25) Employment/Consulting Agreements |
| Prize Investments, LP | | |
| (6) Certificate of Limited Partnership<br>(6) Limited Partnership Agreement | (7) Term Sheet<br>(8) Prospectus/Information Statement<br>(9) Subscription Agreement:<br>(26) Securities filings | (25) Employment/Consulting Agreements<br>(24) Bylaws/Guidelines/Policies (Ethical Standards) |
| Prize Management Company, LLC | | |
| (10) Charter<br>(10) Operating Agreement | (11) Term Sheet<br>(12) Prospectus/Information Statement<br>(13) Subscription Agreement:<br>(26) Securities filings | (14) Management Agreements<br>(25) Employment/Consulting Agreements |
| Prize Fund, LP | | |
| (15) Certificate of Limited Partnership<br>(15) Limited Partnership Agreement | (16) Term Sheet<br>(17) Prospectus/Information Statement<br>(18) Subscription Agreement<br>(26) Securities filings | (25) Employment/Consulting Agreements<br>(24) Bylaws/Guidelines/Policies (Ethical Standards)<br>(27) Insurance policy for prize success (if applicable)<br>(5) Sponsorship Agreements |
| Competitor Companies | | |
| N/A | (19) Tag-Along Option Agreement<br>(20) Royalty/Profit Sharing Agreement<br>(21) Convertible Promissory Note<br>(22) Security Agreement<br>(26) Securities Filings | (23) Master Participation Agreement<br>(23) Master Document Checklist<br>(23) Information Packet<br>(23) Application for Entry<br>(23) Due Diligence Request List<br>(23) Confidentiality/Nondisclosure Agreement |

FIG. 3B

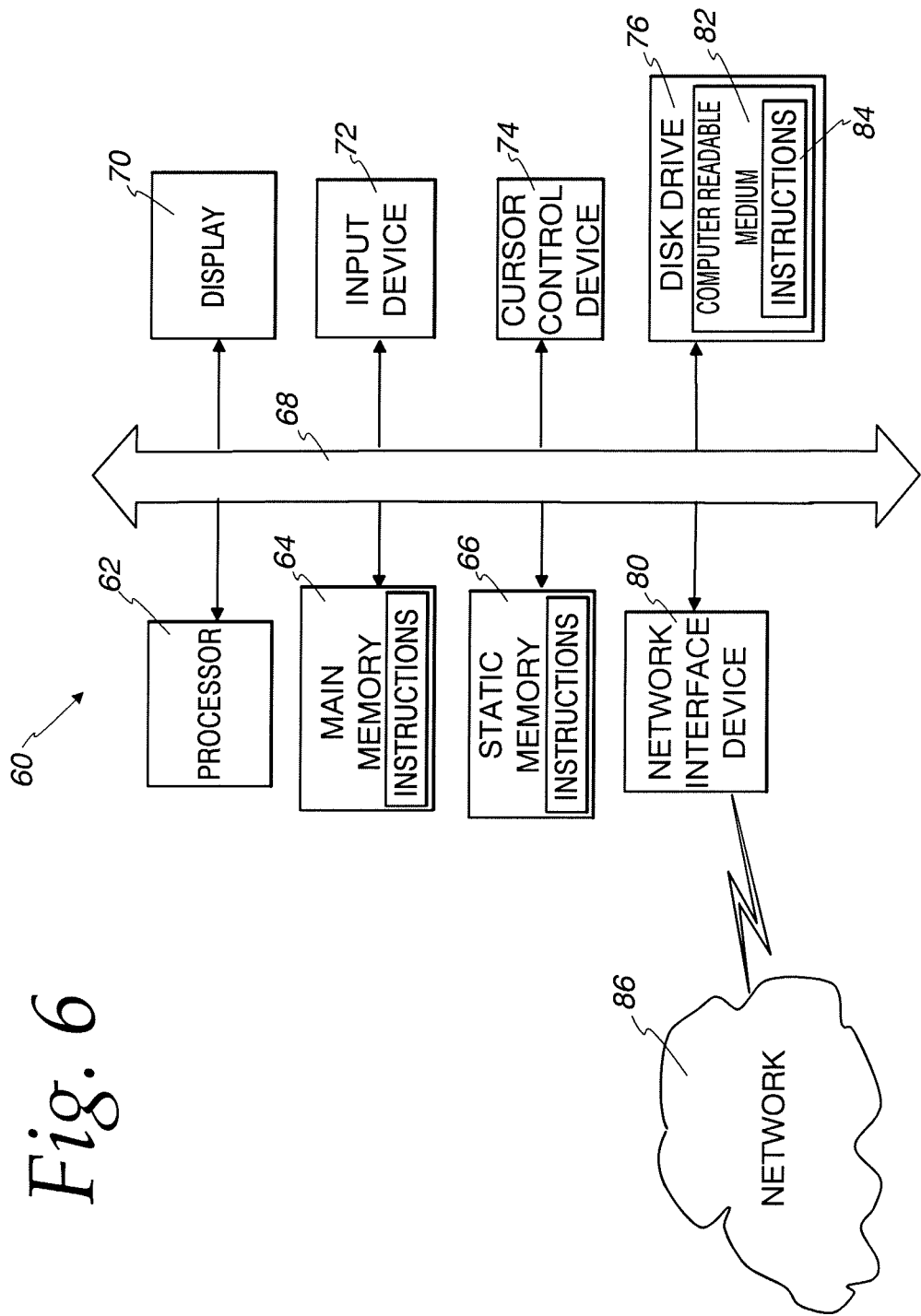

INVESTMENT MODEL FOR FORMATION OF CAPITAL AND VALUE CREATION

CROSS REFERENCE TO RELATED APPLICATIONS

This patent claims the priority benefit under 35 U.S.C. §119(e) of: U.S. provisional application 60/845,889, filed on Sep. 19, 2006, the content of which is incorporated herein by reference for all purposes.

TECHNICAL FIELD

The present disclosure relates to methods and systems for facilitating investment in competitors in a single niche market.

BACKGROUND

In general, investors desire to mitigate the risk of an investment while increasing the probability of achieving a good return. Venture capital investments in technology companies can lead to very high rates of return, but the risks are also high. The risks are high with venture capital because the required investment is often large and there is typically no mechanism to offset a significant loss if the enterprise funded by the venture capital is not a commercial success. Also, while there is the ability to invest in multiple companies within a sector, venture capital firms generally support only one in a group of competing start-ups.

An investment vehicle such as a hedge fund or a mutual fund can spread the risk over several companies, technologies or even types of investment instruments. These investment vehicles, while spreading risk and typically having lower required investment thresholds, may not offer the potentially high returns or involve the type of cutting edge technology that venture capital can reach. Moreover, hedge and mutual funds are often are restricted from investing in start-up companies due to the risk inherent in the lack of public market liquidity status for early stage and thus their capital is not traditionally available to this sector of company.

Accordingly, there is a need for an improved and more flexible investment that can address the drawbacks of current investment methods.

SUMMARY

As described in greater detail below, an investment model is disclosed that can take advantage of revenue generation opportunities and risk mitigation strategies available in circumstances such as in the creation and financing of discovery or prize competitions.

In one embodiment, a method for fostering technological innovation utilizing a competitive format is disclosed. The method includes establishing a contest entity organized to achieve a desired goal, organizing a financing entity to finance a prize associated with the contest entity, recruiting competitors to compete to achieve the desired goal, and establishing a compensation obligation between a plurality of competitors and the financing entity, such that each of the plurality of competitors assumes responsibility for the compensation obligation in order to compete to achieve the desired goal.

In another embodiment, a method for fostering technological innovation utilizing a competitive format is disclosed. The method includes establishing a contest to achieve a goal or goals, defining and describing the goal(s) and contest rules and objectives with specificity, publicizing the contest opportunity, registering competitors to compete in the contest, arranging funding from an investment entity for a prize, such that the prize is payable to the first registered competitor to achieve the contest goal(s), and establishing a compensation obligation to the investment entity for each of the registered competitors, such that the investment entity retains the compensation obligation regardless of which of the registered competitors first achieves the contest goal or goal(s). The investment entity may, in turn, validate ostensibly successful competitors who achieve the contest's goal(s), select the winner, deliver the prize to the winner, and secure and exploit rights associated with the winning technology.

In another embodiment, a method for fostering technological innovation utilizing a competitive format is disclosed. The method includes establishing a contest entity to achieve a desired goal or goals, organizing a financing entity including a for-profit entity and a non-for-profit entity to finance a prize associated with the contest entity, recruiting competitors to compete to achieve the desired goal or goals, and establishing a compensation obligation between a plurality of competitors and the financing entity, such that each of the plurality of competitors assumes responsibility for the compensation obligation in order to compete to achieve the desired goal.

BRIEF DESCRIPTION OF THE DRAWINGS

FIGS. 3A and 3B depict another example of the capital flow through the funding enterprise and contest entity arrangement of FIG. 1.

FIG. 6 is a block diagram of a general computing device and network connectivity suitable for use in implementing one or more aspects of the methods and systems of FIGS. 1-5.

DETAILED DESCRIPTION

Figure 1:
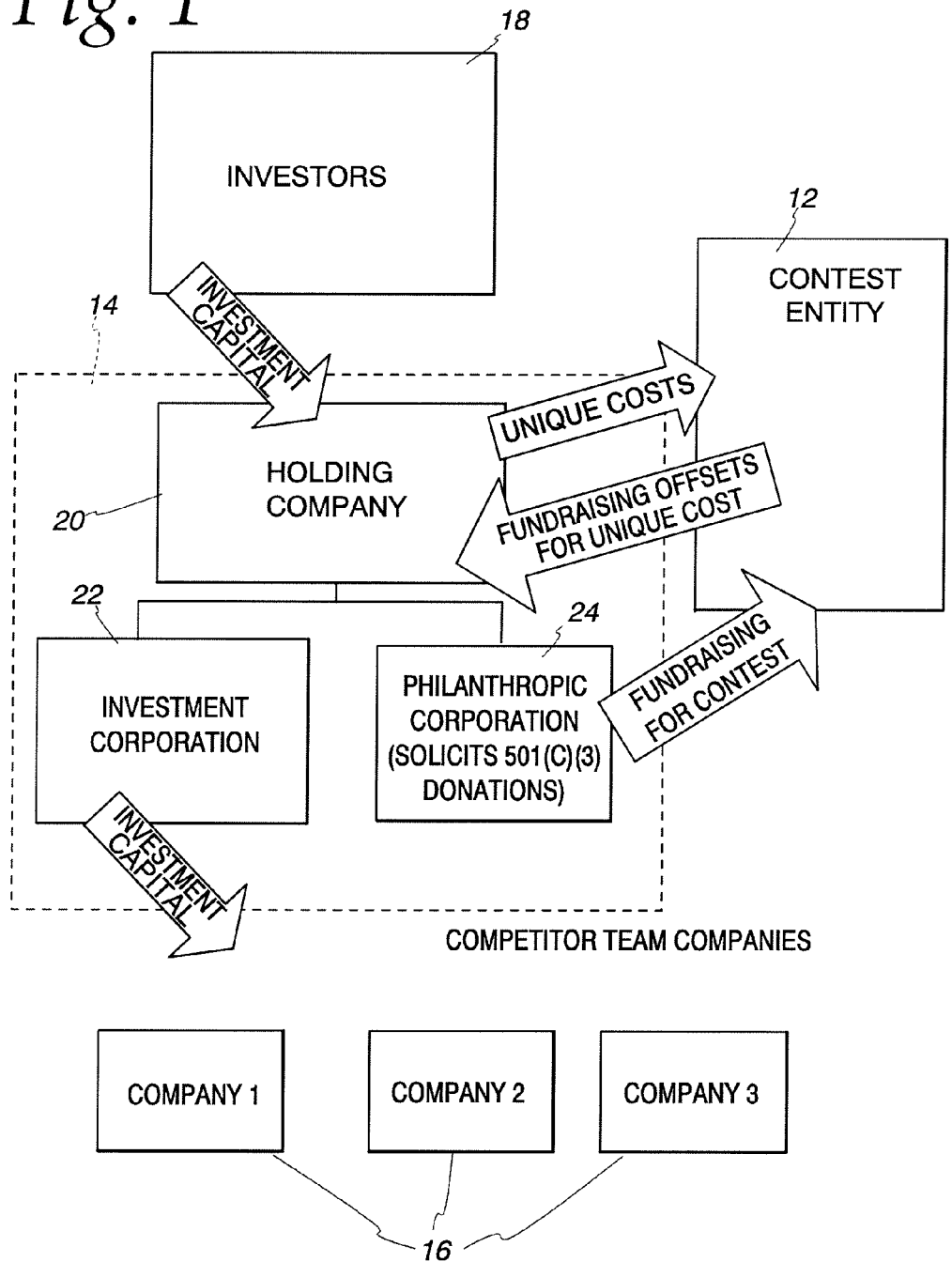
FIG. 1 is a block diagram illustrating an overview of a funding enterprise and contest entity of the example(s) provided herein.

Although the methods and systems described herein are illustrated in the context of competitions based on monetary prizes, embodiments of competitions without monetary prizes are also contemplated. FIG. 1 illustrates an investment based prize competition organizational structure 10 having a contest entity 12 responsible for operating the contest, and a funding enterprise 14 for providing prize funding and investment opportunity. Competitor team companies 16 taking part in the contest and investors 18 of the funding enterprise 14 are also illustrated.

The contest entity 12 may be a non-profit organization, such a non-profit organization qualifying under section 501 (c)(3) of the Unites States Tax Code. In one implementation, the contest entity 12 has a charter to capture public support and foster innovation through competitions designed to seek new advances in science and technology having direct benefits for humanity. Thus, rather than awarding money to honor past achievements or directly funding research, the contest entity may be organized to assemble high profile prize competitions that attract and motivate creative solutions to important challenges facing humanity. The contest entity 12 may use an open contest format that offers to attract diverse entrants and rewards results. One suitable contest entity is the X PRIZE Foundation of Santa Monica, Calif.

The funding enterprise 14 may be organized as a separate commercial vehicle from the contest entity 12. The funding enterprise 14 is formed to support both the contest entity and to support any competitor team company 16 that should choose to compete for a competition prize purse. In this example, the funding enterprise 14 has an exclusive contract with the contest entity 12 to facilitate certain activities as set forth below. The funding enterprise 14 may be a family of companies including a holding company 20, an investment corporation 22 and a philanthropic corporation 24. As noted above, a contest entity such as the X PRIZE Foundation specializes in the creation of prize competitions to foster innovation. In order to operate competitions, the contest entity seeks philanthropic support. The various competitor companies that compete for the prize purse may also need or seek direct funding for research and development (discovery).

A primary function of the funding enterprise 14 is to interface with the contest entity 12 and to provide cash contributions and letter of credit financial support to the contest entity in order to initiate competitions and support competitor team companies as needed. These are not philanthropic donations, but primarily letters of credit. The investment corporation 22, which may be a subsidiary of the holding company 20, may serve as the general partner of a series of investment partnerships. These partnerships are designed, similar to a venture capital model, to invest in entities which are seeking equity capital and seeking to win a prize competition organized by the contest entity. Unlike traditional models, the investment partnerships are designed to have the right, but not the obligation, to invest in every competitor in a prize competition. The philanthropic corporation 24, which may also be a subsidiary of the holding company 20, may serve as a consultant in the area of philanthropy and to assist the contest entity 12 in seeking 501(c)(3) donors.

The funding enterprise 14 offers a unique process which integrates traditional methods of financing with cutting-edge competitions, such as the socially significant and technically challenging competitions such as those of the X PRIZE Foundation. In one embodiment, the funding enterprise 14 is the exclusive equity finance partner of the contest entity and thus creates a new investment vehicle for creating and financing discovery with each contest it funds.

The competitor companies 16 may be any of a number of organizations that qualify to compete under guidelines set by the contest entity 12. It is contemplated that competitor companies 16 may include start-up companies, universities, and established public and private corporations. The investors 18 of the funding enterprise 14 may include, for example, individuals, endowments, governments, corporations and universities.

Some salient features of an embodiment of an investment model that may be implemented using the prize competition structure 10 of FIG. 1 are the ability to provide guarantees in the form of a letter of credit so that the contest entity can implement competitions, the ability to generate interest from third party investors in the equity of competitor teams, and the ability to mitigate risk and spread wealth to third party investors regardless of which competitor team wins a given competition. Other features may include providing funding to the competitor teams, generating publicity for the teams and the competition, and organizing, acquiring and exploiting the intellectual property generated by each of the competitor teams or at least the winning competitor team.

In this example, the funding enterprise 14 is designed to establish a separate investment vehicle for each competition that the funding enterprise and contest entity jointly agree to implement. The investment in the fund established for a particular contest may provide capital for 1) the prize purse, 2) the operation of the competition, and 3) competitors. Each competitor team company 16 executes a master team agreement (MTA) with the contest entity 12 which defines the rules and regulations of the competition. In order to facilitate capital formation, in each MTA each competitor will grant the funding enterprise the right, but not the obligation, to invest in each round of financing. In addition, a royalty pass-through surcharge is imposed as an entry fee.

The funding enterprise's model may accommodate the unique prize opportunities. There are unique costs, unique revenue opportunities, and unique risk mitigation strategies associated with the funding enterprise relative to venture capital and other traditional models. The unique costs of the funding enterprise include those costs associated with the prize purse, peer review and validation of contest results, and management fees. Additionally, various legal fees, such as intellectual property prosecution and licensing and securities law compliance costs are contemplated. Certain unique opportunities for revenue offset and philanthropy offset, however, are available in various embodiments. For example, as discussed in greater detail below, all competitors will preferably contract to provide a royalty payment to the funding enterprise based on income generated from intellectual property generated by the contest. Also, philanthropic donations to the contest entity may be used to reduce investor funds needed from the funding enterprise. The funding enterprise preferably obtains the right, but not the obligation to invest in up to a certain percentage (e.g. 20%) of each financing round for start-up competitors in a given prize competition. Yet another investment alternative available to investors of the funding enterprise is the ability to direct part of their investment to assist a particular competitor while retaining the general investor benefits of royalty and investment rights in remaining competitors.

Risk in an investment according to the investment model described herein may be mitigated by one or more of the following:

1) Return to an investor is agreed upon by the recipient enterprise prior to the investment by investor. In the case of prize competitions, competitors receiving funds agree to compensate investors from future benefit(s) achieved as a result of competing, for example the sale or license of future intellectual property rights or products derived during or from the competition, or option, other equity investment instruments such as funds or derivative related thereto. The compensation can be made payable whether or not competitors remain in, or win the competition;

2) investment is made in multiple ongoing activities, preferably competing activities;

3) continued investment opportunity remains available to an investor for multiple rounds of investment, with or without dilution;

4) competition results are peer reviewed to reduce risk and advance credibility, ensuring that results are real;

5) competing enterprises are focused on one goal, allowing an operating entity and/or investment enterprise to maintain a higher level of control over the investment and mitigate risk of random choices;

6) unique costs, including but not limited to the prize purse, peer review processes or quality control measures, and legal costs are offset by donations;

7) the contest entity (the operating institution managing the competition) has the reputation necessary to attract investors and donations;

8) unlike traditional methods, investors in a fund have the option to invest in the general fund or a select company in the general fund. In one embodiment, the general fund may comprise more than one prize; and 9) investors are able to own equity in all competitors and potentially receive a return on their investment regardless of who wins a prize.

Referring again to the prize competition organization structure 10 of FIG. 1, the funding enterprise's 14 duties include, but are not limited to providing services such as legal, accounting, human resources, intellectual property protection, project management and other support. The funding enterprise 14 also provides cash or a guarantee e.g., letter of credit, etc., for the prize purse associated with a particular competition.

Figure 2:
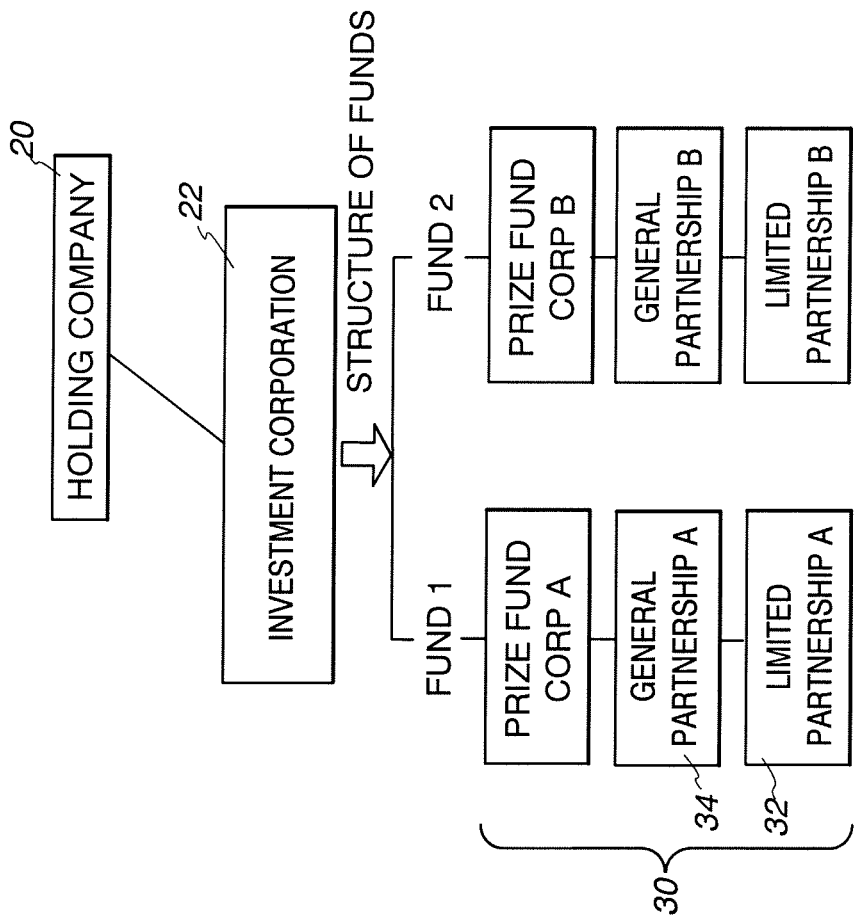
FIG. 2 illustrates an example of separate investment funds that may be set up for each prize competition by the funding enterprise of FIG. 1.

Operating capital for the contest entity 12 to manage the competition will also be provided by the funding enterprise 14. The funding enterprise 14 may, when party to, for example, an exclusivity contract with the contest entity 12, act as the general partner for all funds. A separate fund 30 may be set up for each prize competition as illustrated in FIG. 2. This fund structure can be designed to accomplish a number of goals. Limited partner fund investors 32 can invest in a traditional limited partnership structure, with the added success driver of investing in each of the competitors of a competition through the rights, royalties and/or compensation obligation agreed to under the MTA executed by each competitor as discussed above. General partner fund investors 34 can operate as a traditional general partner.

All unique costs of the funding enterprise and all unique costs of the contest entity are preferably born by the funding enterprise 14. The contest entity 12 may receive an equity participation in the success of the general partner without being a member of the general partner's legal entity. A fixed asset lender, in affiliation with the funding enterprise, will provide a guarantee and thereby permit a letter of credit to be issued to guarantee the prize purse and other unique costs. The guarantor may receive an equity participation in the success of the general partner.

The relationship between the contest entity and funding enterprise may, in one embodiment, be summarized in terms of their respective obligations. The contest entity will preferably be primarily responsible for the development launch and administration of each competition. It is contemplated that a prize discovery process, such as that created by the X PRIZE Foundation will be implemented by the contest entity. For example, a first phase may include recruiting a director for the competition, searching background information on possible prize areas and concepts, generating a preliminary problem statement and translating potential prize concepts into a white paper for consideration. During this first phase it is expected that the contest entity will consider input from the funding enterprise as to the viability of the prize concept. The latter part of the first phase of the prize discovery process may then include further refining the problem statement for the contest, developing rules and prize ideas, developing initial media outreach and silent phase assembly of potential sponsors and initial competition teams. The contest entity may then consider further opinions from the funding enterprise as to the viability of formally launching a joint competition where the funding enterprise will participate.

Upon an agreement between the funding enterprise and the contest entity as to viability of going forward with a joint competition, the next phase of the prize discovery process to be implemented by the contest entity is to enter into a formal agreement with the funding enterprise setting forth the specific obligations of each party with respect to the specific competition. In one embodiment, the agreement between the contest entity and funding enterprise may require the contest entity to agree to the task of executing the initial competition announcements, distribution of promotion materials and moving forward with public relations and governmental relations efforts. Additionally, the competition agreement between the contest entity and funding enterprise will also preferably list obligations of a contest entity in recruiting teams in attaining executed agreements from all the competing teams that provide the funding enterprise with certain consideration, described in greater detail below, for providing funding to the contest and the contest's prize purse.

Finally, it is contemplated that the contest entity's management responsibilities for running the joint competition with the funding enterprise will include, for example, managing the joint competition through completion. Contest management activities may include planning and executing annual events, preparing and distributing promotional materials, coordinating and promoting teams and team members, and maintaining an interactive campaign and website presence. Other contest management activities may include annual advice reports summits, public relations and government relations activities, and fund-raising activities.

In one implementation, it is contemplated that the contest entity will pursue philanthropic fund-raising activities. These fund-raising activities may be used to offset or replace funds otherwise supplied by the funding enterprise.

In one embodiment, the agreement between the contest entity and funding enterprise may obligate the funding enterprise to provide administrative expenses to the contest entity upon launching a jointly sponsored contest. The administrative fees may be limited in amount or timing. For example, a maximum administrative fee burden may limit the amount of administrative expenses that the contest entity may request from the funding enterprise. Alternatively, or in conjunction with this administrative fee limit, the funding enterprise may retain the right to limit payouts to the contest entity such that completion of pre-designated milestones during a contest must be proven by the contest entity prior to payment of certain administrative fees by the funding enterprise.

Another obligation that the funding enterprise may have under an agreement with a contest entity is to assure availability of prize money, for example in the form of a letter of credit from a commercial bank or other entity. The funding enterprise may also be obligated to provide start-up loans for each qualified competitor, as well as payments of the necessary verification and peer review required for verifying claims made on a prize for the competition.

With respect to the financial obligations of the funding enterprise for the prize money, the funding enterprise may be required to identify an individual or entity to serve as guarantor by obtaining a letter of credit in favor of the contest entity to secure the obligation for the prize money. Although the letter of credit may initially be required to be in the aggregate amount of the prize, as the contest entity raises funds for a particular contest, the amount of the letter of credit may be reduced by the amount of funds raised by the contest entity.

Figure 3:
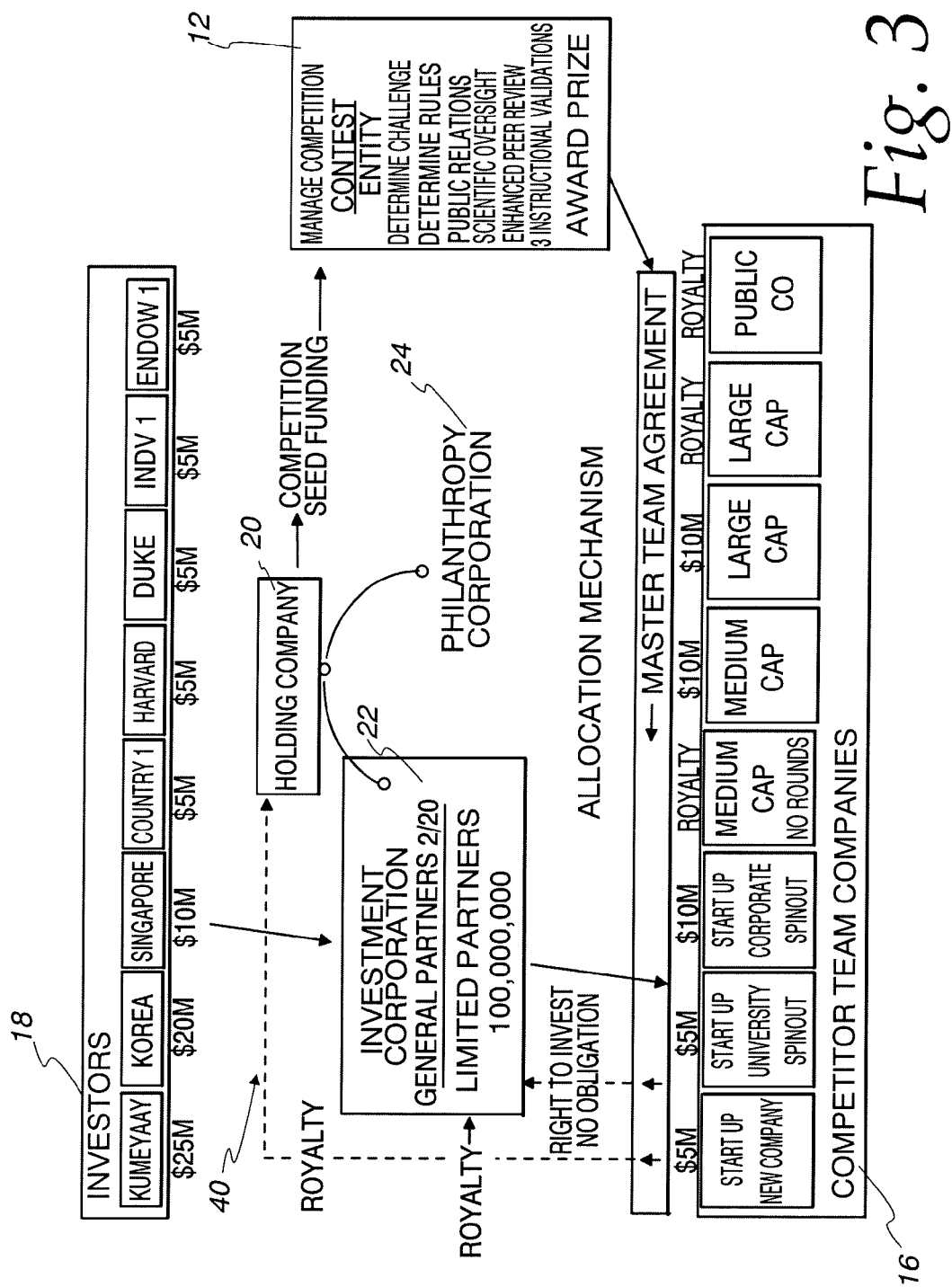
FIG. 3 depicts an example of the capital flow through the funding enterprise and contest entity arrangement of FIG. 1.

FIG. 3 illustrates an exemplary capital flow 40 through the funding entity. Investors 18 include countries, institutions, individuals, and others. The funding enterprise creates a contest specific fund and uses the distributed allocation mechanism to invest capital in each of the competitors, who provide value in return under the terms of a master agreement executed simultaneously upon entering the competition. Each competitor team company 16 may receive a base level of funding plus exogenous capital from investors. Unique prize-related costs associated with the prize, such as management costs, validation costs, and the prize purse are allocated to the entity operating/managing the prize (the contest entity in this case) in the form of a letter of credit. Fundraising by the contest entity 12 and the philanthropic corporation 24 of the funding enterprise 14 offsets unique costs and the letter of credit is decreased dollar for dollar by funds raised. The contest entity can also receive an equity participation in the success of the general partner without being a member of the general partner's legal entity. Investors are offered the right, but not the obligation to invest in any competitor. Investors receive value in return for their investment by participating in the economic and commercial successes of the winner of the prize, and also are able to participate in the economic and commercial success of competitive technologies that may emerge from other competitors.

Figure 3A:
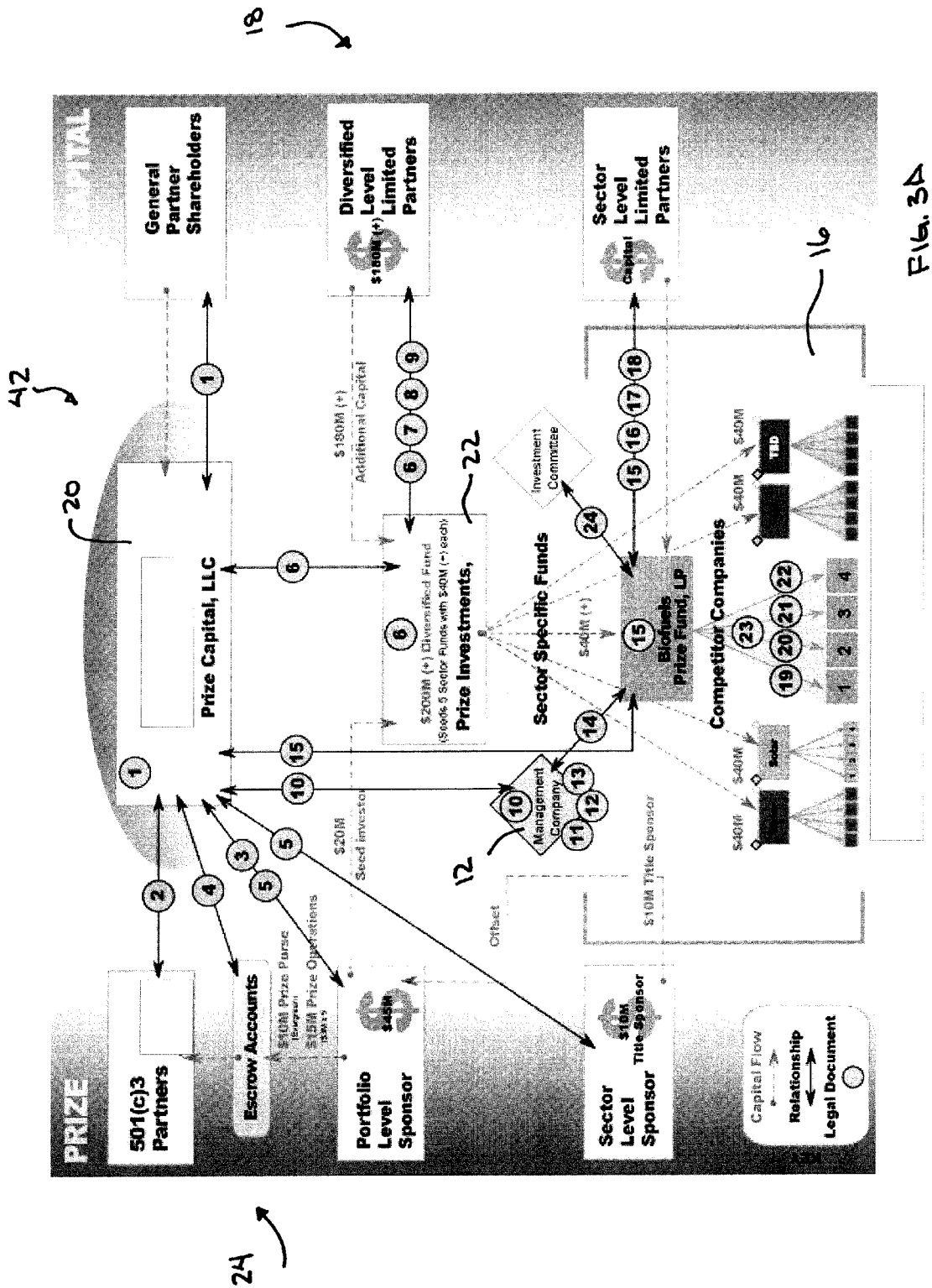

FIGS. 3A and 3B illustrate another exemplary capital flow 42 through the funding entity. In this embodiment, the investors 18 may include the entities discussed above as well as other diversified and sector partnerships as indicated. The funds provided by the investors 18 may be managed by the funding enterprise. The funding enterprise, in turn, may create an investment corporation 22 to allocate, distribute and invest capital in each of the competitors 16. The competitors 16 agree to provide value in return for the funding. Thus, each competitor team company 16 may receive a base level of funding plus exogenous capital from investors. Unique prize-related costs associated with the prize, such as management costs, validation costs, and the prize purse are allocated to the entity operating/managing the prize (the contest entity in this case) in the form of a letter of credit. Fundraising by the contest entity 12 and the philanthropic corporation 24 of the funding enterprise offsets unique costs and the letter of credit is decreased dollar for dollar by funds raised. FIG. 3B illustrates and explains one embodiment of the legal and contractual framework under which the capital flow 42 may be established and managed. In particular, the legal document or agreement between each entity and/or organization participating in the cash flow 42 is identified and discussed. This legal and contractual framework provides the basic framework under which the investors 18, competitors 16, etc., interact to achieve the contest goal or goals. Moreover, upon completion or satisfaction of the contest, this legal and contractual framework allows the participants to reap the rewards and/or benefits achieved through the contest innovations. It will be understood that the extent to which participants receive a return on investments, funds, etc. can be determined based on their contractual obligations and payouts, for example, as discussed in connection with the capital flow 40 shown in FIG. 3.

Figure 4:
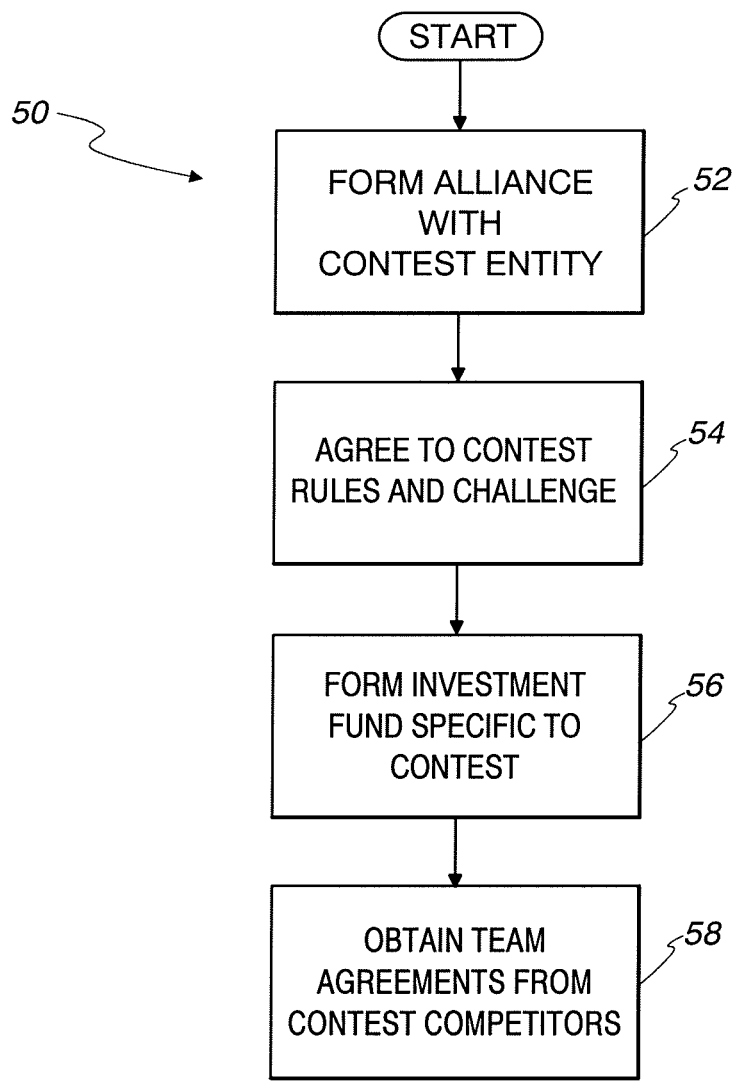
FIG. 4 is a flow diagram illustrating contest and funding preparations leading up to a launch of a competition funded by the funding enterprise of FIG. 1

As indicated in FIG. 4, an embodiment of an investment process 50 supporting the capital flow 40 of FIG. 3 is shown. The contest entity forms an alliance with the funding enterprise (at 52). This alliance may be an agreement dictating that the funding enterprise retains exclusive rights to for-profit investment in competitors of any competition the funding enterprise provides funding for. A particular scientific or other socially beneficial challenge is defined and agreed on by the funding enterprise and contest entity (at 54) and the funding enterprise forms a contest specific fund for the contest (at 56). The funding enterprise provides for the prize purse and obtains agreements from preferably all competitors in the contest to provide compensation from, and/or investment rights in, the competitors (at 58).

As an example of a potential contest to achieve a scientifically desirable and potentially socially beneficial goal, the creation of an investment fund for a contest directed to stem cell research is now described. Subject to due diligence and formalization of an acceptable set of rules, the funding enterprise provides the backing for a prize purse for a competition in the area of Stem Cell Research. The competition may be in multiple parts. A two part competition might have a prize purse for the first to successfully demonstrate therapeutic stem cell nuclear transfer (with exact specifications to be developed), and the second part might have a prize purse for the first to successfully "cure" a disease (as defined technically by the contest entity), such as Diabetes, Alzheimer's, or Parkinson's disease, by any methodology.

An example of the funding enterprise's 14 monetary obligation to the contest entity for each part of the prize contest is as follows, in any combination of cash and letters of credit:

| | |
|---|---|
| $10,000,000 | funding for the prize purse |
| $3,000,000 (est.) | funding for institutional peer review |
| $2,000,000 (est.) | funding to operate the competition |
| $3,000,000 (est.) | loans to facilitate intellectual property protections for competitors |
| $18,000,000 | Total |

These letters of credit guarantees may be reduced in an amount equal to any philanthropic contributions to the contest entity related to the competition.

The investment corporation 22 would be responsible for:

1. Creating an investment fund in this area of discovery.
2. Creating a mechanism to enable the contest entity to fund an enhanced peer review and validation mechanism which includes replication of scientific claims by, for example, funding three world-renowned scientific institutions to simultaneously replicate such claims.
3. Providing the financial resources in the form of equity for research teams to focus on this important area of discovery.

Although numerous variations are contemplated, an example of sample rules to participate in the prize:

1. The contest entity shall administer the contest.
2. All competitors shall sign a contest entity master team agreement (MTA). The MTA is a contract between the competitor team companies and the contest entity.
3. The contest entity shall convene a world-class panel of eight (8) judges to award the prize purse.
4. The panel of judges shall retain three (3) independent world-class research institutions to validate claims and to reproduce the results. They shall do so:
   To assure peer review integrity;
   To assure a timely and immediate peer review process; and
   To assure scientific validation and reproducibility by blue ribbon pre-approved institutions in a defined process.
5. In order to compete in the contest, a competitor must agree to the following conditions:
   a) The competitor must be a legal entity eligible to enter into contractually binding agreements. University-based or company-based competitor team companies must adhere to the university or company policies and procedures for spin-out of technology. The master team agreements will contain a technology transfer license that must be executed (or consented to) by any such university or company by whom the competitors are employed.

b) The competitor team companies must enter into a royalty agreement whereby the funding enterprise will receive a royalty, such as a fixed or variable percentage on all revenue generated from all products and intellectual property created as a result of the competition, whether or not the competitor team company withdraws from the competition. This is a "surcharge royalty" as the competitor can charge any fee to third parties so long as the funding enterprise royalty is collected and paid. This royalty will be reduced if stacked royalties exceed a specified maximum.

c) The competitor team companies must grant the funding enterprise an equity investment right to co-invest, on equal terms, to a maximum of 20% per round, in any round of private debt or private equity financing. If the funding enterprise chooses not to participate in a given private financing round, it retains the right to co-invest up to 20% in future rounds. This right shall survive and be available for any and all rounds of private financing for the duration of the contest, whether the funding enterprise declines participation in any given round. This right will not apply to publicly traded companies.

d) A liquidated damages provision may be included in the master team agreement to provide that failure by a competitor to include the funding enterprise in a round of debt or equity financing shall cause the surcharge royalty to double.

e) If a competitor team company is acquired, or if a liquidity event occurs, prior to an IPO, then the surcharge royalty shall double unless a mutually agreed upon mechanism is provided by the acquirer to protect the equity investment right.

6. The funding enterprise will provide funding for legal assistance, up to a maximum of $100,000 per competitor team company, for approved law firms for intellectual property protection and incorporation costs to establish legal entities. This funding shall be in the form of an interest bearing loan secured by the intellectual property accompanied by a signed security agreement and a UCC-1 financing statement to be filed on the property.

7. The funding enterprise shall provide an equity capital fund to invest in each competitor team company, upon request of any competitor, but shall not be obligated to invest. This would be traditional investment capital in addition to the rights set forth above.

8. Any entity that announces it has demonstrated success in either part of the prize must have its results verified by the panel of judges selected by the contest entity. Each ten million dollar Prize (US$10,000,000) will be awarded to the competitor when its process has been duplicated by each of the approved labs, and when the panel of judges agrees that the goal has been accomplished. These awards can be won independently. That is (in the stem cell example noted above), nuclear transfer does not need to be used to develop the cure, nor does the winner need to have been a competitor in the nuclear transfer competition.

The funding enterprise preferably provides the capital for validation to occur. Validation is managed by the organization operating the prize, in this example the contest entity, to ensure quality peer review and validation. Upon submission of a claim for the prize, a panel of internationally recognized and independently funded judges will apply an enhanced methodology with protocols designed to assure validation and verification through funded replication of scientific claims.

The funding enterprise will provide a letter of credit to the contest entity at the commencement of a mutually agreed upon competition. The contest entity will then be in a position to announce and launch the competition. The funding enterprise will, either directly or in conjunction with a third party asset based lender ("Letter of Credit Guarantor"), provide the letter of credit. If an asset based lender is utilized, said lender will be granted a partnership interest in any investment corporation general partner created for that given competition.

Upon announcement of a competition, consistent with all contest entity competitions, the contest entity will cause competitors to register for the competition and have a master team agreement (MTA) executed which sets forth the rules of the competition and the obligations of all participants, including the contest entity. The letter of credit will terminate if a sufficient number of competitor team companies fail to execute the (MTA). The number of required competitor team companies will be agreed on in advance between the contest entity and funding enterprise on a contest by contest basis.

Figure 5:
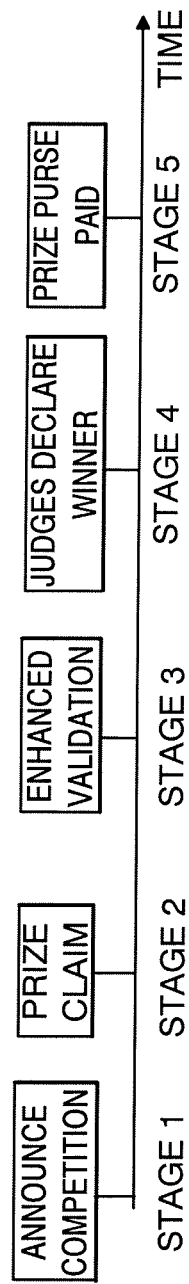
FIG. 5 depicts a simplified contest timeline for a contest administered using the methods and systems of FIGS. 1-4.

In order to understand the financial engineering mechanism which enables the letter of credit to be issued, a sample project timeline could display as shown in FIG. 5. At stage 1, the competition is announced, the MTA process is completed and the letter of credit is issued. At stage 2, the prize is claimed. At stage 3, enhanced validation is initiated. At stage 4, the prize judges declare a winner. At stage 5, the prize is paid.

When the MTA is signed (stage 1), each competitor team company will agree to provide an entry fee. The entry fee, as set forth in the MTA, may provide that the competitor team company agrees to provide consideration in the form of a royalty surcharge to the funding enterprise on all intellectual property generated by the company as a result of its involvement in the prize competition.

The contest entity will operate the competition according to its contract with the funding enterprise and under the terms of the MTA, so that any claim of the prize purse will be validated by an independent panel of three previously stipulated world renowned scientific institutions (stage 3) and, that the panel of judges will supervise the replication protocols for authenticity so as to be able to announce a winner (stage 4)

The funding enterprise, or its asset based lender, will assign the entry fee royalty surcharge rights and, together with their corporate guarantees, pledge those rights as collateral ("Collateral") for the letter of credit.

It is anticipated that the bundle of royalty surcharge rights will have a minimum asset value during stages 1 and 2. The rights may gain value at the beginning of stage 3. Upon successful completion of stage 3, when multiple third party world renowned institutions have implemented and successfully replicated the scientific claims of the principal investigator, the bundle of rights gains may provide a high value, which may be further enhanced during stage 4 when the panel of judges declares a winner. All of this happens before the letter of credit can be drawn, and therefore before the financial risk is material.

Therefore, while the bundle of royalty surcharge rights have a minimum asset value during stage +1, and therefore minimum value as collateral for the letter of credit, the financial risk to the funding enterprise, or its secured asset lender, do not materialize until after the prize is claimed (stage 2), and the replication & validation process has been completed (stage 3), and the panel of judges has declared a winner (stage 4). By design, the letter of credit associated with the prize purse, $10,000,000 is only drawn once the prize competition proves successful and the Collateral has potentially gained significant value. Therefore, the collateral, a bundle of royalty surcharge rights to the innovations created by every competitor as part of the contest, is likely to have considerable value before the letter of credit is drawn. The risk associated with the letter of credit will be a function of the number of contestants, the quality of contestants, and the time the letter of credit remains open.

In addition to consideration in cash paid for the letter of credit to be issued, the guarantor will also be granted a partnership interest in the general partner created for that given competition by the investment corporation 22.

Two additional conditions have been added to reduce the risk of the letter of credit. First, if the contest entity is able to secure charitable donations to the competition in its role as a 501(c)(3), the capital commitment from the funding enterprise will be reduced on a dollar for dollar basis. In order to further minimize risk, the funding enterprise would also engage in activities to support philanthropic donations to the contest entity, and such additional donations will also permit the letter of credit to be reduced.

Second, in order to encourage philanthropic donations, the letter of credit, by design, will only have a useful life of 3 years. This is deemed to be a sufficient time for the competition to be announced, the MTA process to be underway or completed, and the philanthropic support to materialize. The first funding to be replaced will be for the prize purse monies. The second funding to be replaced will be for the replication and validation expenses. The third funding to be replaced will be for legal fees associated with intellectual property protection and legal entity establishment. The fourth funding to be replaced will be for the contest entity operating expenses.

Intellectual Property—A Product of Innovation:

Another aspect of the investment mechanism described herein is that each team may own and protect the intellectual property that it develops and there will be no cross ownership. The competitor team company will pay for all intellectual property filings and transfers with capital provided by the fund. The investment fund of the fund enterprise will own intellectual property through its ownership interests in the underlying competitor team companies.

The investment fund generated for each contest may offer substantial financial benefits for university endowments, academic departments, students, faculty and entrepreneurs, and allow the contest entity to act as a catalyst for investor returns through the commercial implementation of the scientific breakthroughs created by each competition. A small amount of investment can be highly leveraged. By opening up prizes to all of science and technology, and methods of financing that reduce risk and increase the probability of return on investment, radical breakthroughs can be created in many disciplines and new industries nurtured.

Referring now to FIG. 6, an illustrative embodiment of a general computer system that may be used for implementing one or more aspects of the methods shown in FIGS. 1 through 5 is shown and is designated 60. The computer system 60 can include a set of instructions that can be executed to cause the computer system 60 to perform any one or more of the methods or functions disclosed herein. The computer system 60 may operate as a standalone device or may be connected, e.g., using a network, to other computer systems or peripheral devices. One or more of the investors, funding enterprise, contest entity and competitor team companies may perform one or more steps via a computer or system as shown in FIG. 6

In a networked deployment, the computer system may operate in the capacity of a server or as a client user computer in a server-client user network environment, or as a peer computer system in a peer-to-peer (or distributed) network environment. The computer system 60 can also be implemented as or incorporated into various devices, such as a personal computer (PC), a tablet PC, a set-top box, a personal digital assistant (PDA), a mobile device, a palmtop computer, a laptop computer, a desktop computer, a network router, switch or bridge, or any other machine capable of executing a set of instructions (sequential or otherwise) that specify actions to be taken by that machine. In a particular embodiment, the computer system 60 can be implemented using electronic devices that provide voice, video or data communication. Further, while a single computer system 60 is illustrated, the term "system" shall also be taken to include any collection of systems or sub-systems that individually or jointly execute a set, or multiple sets, of instructions to perform one or more computer functions.

As illustrated in FIG. 6, the computer system 60 may include a processor 62, e.g., a central processing unit (CPU), a graphics processing unit (GPU), or both. Moreover, the computer system 60 can include a main memory 64 and a static memory 66 that can communicate with each other via a bus 68. As shown, the computer system 60 may further include a video display unit 70, such as a liquid crystal display (LCD), an organic light emitting diode (OLED), a flat panel display, a solid state display, or a cathode ray tube (CRT). Additionally, the computer system 60 may include an input device 72, such as a keyboard, and a cursor control device 74, such as a mouse. The computer system 60 can also include a disk drive unit 76 and a network interface device 80.

In a particular embodiment, as depicted in FIG. 6, the disk drive unit 76 may include a computer-readable medium 82 in which one or more sets of instructions 84, e.g. software, can be embedded. Further, the instructions 84 may embody one or more of the methods or logic as described herein. In a particular embodiment, the instructions 84 may reside completely, or at least partially, within the main memory 64, the static memory 66, and/or within the processor 62 during execution by the computer system 60. The main memory 64 and the processor 62 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. For example the alliance agreement, contest agreements, competitor registration and fund creation, payment of funds by the funding entity, offsetting of funds from the funding enterprise and so on may be implemented in software or firmware and partially or completely automated. Additionally, communications between the entities described with respect to FIGS. 1-5 may be facilitated or automated. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 84 or receives and executes instructions 84 responsive to a propagated signal, so that a device connected to a network 86 can communicate voice, video or data over the network 86. Further, the instructions 84 may be transmitted or received over the network 86 via the network interface device 80.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols commonly used in carrying out financial transactions and communications, the invention is not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

An investing method has been described above where a funding enterprise and contest entity can provide an enhanced investment vehicle. An enterprise structure for funding a prize may be created separate from the institution administrating and/or operating the prize contest. This funding enterprise structure may be a company, a partnership, a corporation such as a C, S or limited liability corporation, or have any of a number of business organizational schemes. The enterprise structure's responsibilities may include one or more of the following: interfacing with the operating institution; providing and raising funds, for example the prize purse, operating capital, capital for legal fees, and capital for replication experiments; providing services such as legal services, accounting services, human resource services, management of intellectual property, and/or other general and administrative support consistent with the needs of an enterprise of such a nature; and providing its own operating capital.

Investors, through the funding enterprise described herein, are able to own equity in all direct competitors. Through this unique investment approach the funding enterprise permits investors to not only share in the economic and commercial successes of the winner of a prize competition such as the "X PRIZE", but also to participate in the economic and commercial success of competitive technologies that may emerge from other competitor team companies. One competitor will win the prize, but the technology created by other competitor team companies may also generate wealth and may actually win the market share. Alternatively, if no one wins the prize, the technology, ideas and areas of research invested by each of the competitors towards the prize may still be exploited and commercialized. Thus, there may be substantial economic and commercial gains realized by investors even if the defined challenge and goals are not achieved.

The funding enterprise structure may have one or more subsidiary entities to manage different aspects of its business and to reduce the risk of the parent. In one embodiment, at least one of the subsidiary entities may be responsible for one or more of the following: creating and operating limited partnerships, serving as a general partner of the parents' subsidiary entities, making investment decisions in investment entities, funding equity investment and facilitating third party fund raising.

Similar to traditional prize competitions, such as the X PRIZE Foundation's X PRIZE competition, where a number of direct competitors seeking a specific scientific goal were attracted to the competition, the method and system of incorporating an investment element to this type of contest may help attract direct competitors to achieve a goal. In addition, the disclosed investment mechanism provides a potential way to fund more, and potentially larger, competitions. Potential advantages of this investment model include the ability to spread risk by allowing investors to essentially wager on the potential success of all contestants, regardless of which contestant wins the prize purse for the particular competition. It is possible that no competitor will win the designated prize, but that the funding enterprise and its investors will still benefit from royalties on intellectual property generated in the competitor's quest for the prize. Furthermore, the investment mechanism described above is highly leveraged because much of the money for the contest doesn't change hands until the actual prize is awarded. A great deal of the early-stage creation of the competition can be accomplished with irrevocable letters of credit, substantially increasing the internal rate of return calculations for the funding enterprise and its investor base.

The invention claimed is:

1. A system for fostering technological innovation utilizing a competitive format, the system comprising:
 a processor;
 a memory in communication with the processor, the memory configured to store processor executable instructions and wherein the processor executable instructions are configured to:
  receive, via a communications interface coupled to the processor, a registration request from a competitor directed to a contest entity organized to achieve a desired goal;
  perform, in response to the registration request, a registration process on the competitor, wherein the registration process verifies at least information provided via the registration request;
  receive, via the communications interface, confirmation from the contest entity that an agreement between the competitor and a financing entity is created based on the registration process verification, wherein a compensation obligation exists from the competitor to the financing entity, and wherein the financing entity is established to finance a prize associated with the contest entity;

communicate, via the communications interface, an acknowledgment to the competitor that the compensation obligation exists between the contest entity and the competitor;

generate, using the processor and the memory, a financial instrument guaranteed by the financing entity in response to the received confirmation;

communicate, via the communications interface, the financial instrument to the contest entity in response to the received confirmation;

receive and store in a database, using the processor, a claim of contest completion by a competitor and related claim data in order to validate the claim of contest completion; and provide the competitor with the financial instrument as a result of utilizing the competitive format, via the communications interface, wherein the financial instrument provides funding to compete for the prize.

2. The system of claim 1 wherein the processor executable instructions are further configured to communicate, to the processor, an acknowledgment to the contest that the compensation obligation exists between the contest entity and the competitor.

3. The system of claim 1, wherein the compensation obligation is selected from the group consisting of: an equity option in one or more of the competitors; a license to intellectual property; proceeds from a sale of assets and a contest fee.

4. The system of claim 1, wherein the contest entity is organized to achieve the desired goal in an area selected from the group consisting of: medical science, technological innovation; conversation and environmentalism.

5. The system of claim 1, wherein the financing entity includes a for-profit entity and a not-for-profit entity.

6. The system of claim 5, wherein the for-profit entity includes at least one investor.

7. The system of claim 5, wherein the for-profit entity is an investment fund.

8. The system of claim 6, wherein the at least one investor maintains an interest in the compensation obligation associated with each of the plurality of competitors.

9. The system of claim 5, wherein funding raised by the not-for-profit entity proportionately reduces an obligation of the for-profit entity to finance the prize.

10. The system of claim 1, wherein the competitor is one of a plurality of competitors that receives a funding amount in response to assuming the compensation obligation.

11. The system of claim 10, wherein the at least one of the plurality competitors forgoes the funding amount.

12. The system of claim 11, wherein the at least one of the plurality of competitors pays a contest fee.

13. The system of claim 2, wherein the memory includes the database, or wherein the database is in communication with the memory and the processor.

* * * * *

UNITED STATES PATENT AND TRADEMARK OFFICE
CERTIFICATE OF CORRECTION

PATENT NO. : 8,473,384 B2
APPLICATION NO. : 11/857677
DATED : June 25, 2013
INVENTOR(S) : Lee H. Stein It is certified that error appears in the above-identified patent and that said Letters Patent is hereby corrected as shown below:

In the Claims

In column 16, claim 13, line 27, after "The system of" replace "claim 2," with --claim 1,--.

Signed and Sealed this
Seventeenth Day of September, 2013

Teresa Stanek Rea
*Deputy Director of the United States Patent and Trademark Office*